(12) United States Patent
Cheng

(10) Patent No.: US 6,746,266 B2
(45) Date of Patent: Jun. 8, 2004

(54) DUPLEX FIBER OPTIC CONNECTOR DEVICE

(75) Inventor: Yung Chang Cheng, Tu-Chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/301,125

(22) Filed: Nov. 20, 2002

(65) Prior Publication Data

US 2004/0033709 A1 Feb. 19, 2004

(30) Foreign Application Priority Data

Aug. 16, 2002 (TW) .................................... 91212778 U

(51) Int. Cl.[7] .......................................... H01R 13/627
(52) U.S. Cl. .................................................. 439/352
(58) Field of Search ............................ 439/352, 355, 439/347, 717, 701; 385/53, 71, 59

(56) References Cited

U.S. PATENT DOCUMENTS

| | | | | |
|---|---|---|---|---|
| 5,122,077 A | * | 6/1992 | Maejima et al. | 439/398 |
| 5,288,251 A | * | 2/1994 | Sumida | 439/701 |
| 5,386,487 A | * | 1/1995 | Briggs et al. | 385/59 |
| 5,895,296 A | * | 4/1999 | Okabe | 439/701 |
| 6,240,228 B1 | * | 5/2001 | Chen et al. | 385/53 |
| 6,332,813 B1 | * | 12/2001 | Okabe et al. | 439/701 |
| 6,343,959 B2 | * | 2/2002 | Sato | 439/701 |
| 6,375,517 B1 | * | 4/2002 | Okabe et al. | 439/701 |
| 6,402,568 B1 | * | 6/2002 | Nagai | 439/701 |

* cited by examiner

Primary Examiner—Tulsidas C. Patel
(74) Attorney, Agent, or Firm—Wei Te Chung

(57) ABSTRACT

A duplex fiber optic connector device includes a first connector housing (200) for receiving a first optical fiber plug, and having a first latch member (400) unitarily molded therewith; and a second connector housing (300) for receiving a second optical fiber plug, and having a second latch member (500) unitarily molded therewith. The first latch member comprises four retention members (410, 420) each having an opening (412). The second latch member comprises four hooked members (510, 520) each having a protrusion (512). The protrusions are received in the openings such that the first latch member is in loose engagement with the second latch member. The first connector housing is thus held in a side-by-side relationship with the second connector housing with a slight relative movement, or float, allowed.

14 Claims, 7 Drawing Sheets

DUPLEX FIBER OPTIC CONNECTOR DEVICE

BACKGROUND OF THE INVENTION

1. Field of the Invention

This invention generally relates to fiber optic connectors, and more particularly to a duplex fiber optic connector device having a pair of individual fiber optic connectors in a side-by-side relationship.

2. Prior Art

Fiber optic connectors are used to provide optical connections between fibers and input/output ports of optical components. Light bearing information can be transmitted to different terminals via such connectors. Originally, fiber optic systems utilized simplex interconnection systems with single connector plugs terminating single fiber optic cables. In a simplex system, only transmission or reception of information can take place at one time. Consequently, simplex systems are severely limited in the amount of information that they can transmit and receive during a given period of time. To increase the amount of information that can be transmitted in fiber optic systems, multi-channel systems were developed. Such multi-channel systems include, for example, duplex connector plugs and cables which are capable of simultaneous transmission and reception. Thus, using a duplex system enables information to be transmitted at a much higher rate.

In order to manage duplex connector plugs and cables, structures have been designed for interconnecting two fiber optic connectors in a side-by-side relationship to form a duplex connector. For instance, adapter structures have been designed which provides a pair of side-by-side through receptacles for receiving a pair of fiber optic connectors in a side-by-side arrangement. Not only do such duplex adapters increase costs by requiring an additional, somewhat bulky component, but they also have difficulty maintaining proper axial alignment of connectors, which is necessary far optimum signal transmission. Manufacturing inaccuracies or large tolerances cause misalignment in such duplex connectors or adapters. Consequently, other interconnection systems, adapters or the like have been designed for holding a pair of fiber optic connectors in a side-by-side arrangement which compensate for misalignment due to manufacturing tolerances and the like.

A conventional duplex fiber optic connector is disclosed in U.S. Pat. No. 6,267,514 (referring to FIGS. 6 to 8). This connector comprises a first connector housing 110, a second connector housing 120, and a latch member 150. The first connector housing 110 comprises a pair of first locking members 130 molded integrally therewith. Each locking member 130 includes a locking flange 131 with a chamfered edge 132 and an elongated opening 133. The second connector housing 120 comprises four hooked arms 141. The latch member 150 has four retention arms 151 projecting laterally outwardly from the four corners thereof. The latch member 150 has a pair of latches 152 each having a chamfered surface 153. The latch member 150 is unitarily molded and loosely engages with the second connector housing 120 by the retention arms 151 loosely engaging with the hooked arms 141 of the second connector housing 120.

When the first connector housing 110 is to be engaged with the second connector housing 120, the first locking members 130 are first opposed to the latch member 150, the chamfered surfaces 153 being aligned with the chamfered edges 132 of the first locking members 130 such that the latches 152 of the latch member 150 are guided into the openings 133 of the first locking members 130. The latches 152 are pressed against the locking flanges 131 so that the latch member 150 becomes engaged with the first locking members 130. The first connector housing 110 can be moved relative to the second connector housing 120 in a small range since the latch member 150 is in loose engagement with the hooked arms 141 of the connector housing 120. Therefore, the connector housings are held in a side-by-side relationship with "float" therebetween provided by the loosely engaged latch member.

However, the relative movement between the two connector housings is provided by the latch member 150 being in loose engagement with the locking arms 141 and the latch member 150 being in tight engagement with the first locking members 130. The structure is complicated and difficult to manufacture. In addition, the latches 152 of the latch member 150 are tightly received in the openings 133 of the first locking members 130 and press tightly against the locking flanges 131, which make disassembly of the two connector housings very difficult. An improved duplex fiber optic connector device is desired.

SUMMARY OF THE INVENTION

Accordingly, an object of the present invention is to provide a duplex fiber optic connector device which has a simple structure and which is easy to manufacture and to disassemble.

To achieve the above objects, a duplex fiber optic connector system according to a preferred embodiment of the present invention comprises a first connector housing for receiving a first optical fiber plug, and including a first latch member unitarily molded therewith; and a second connector housing for receiving a second optical fiber plug, and including a second latch member unitarily molded therewith; wherein the first latch member comprises four retention members each having an opening, the second latch member comprises four hooked members each having a protrusion, and the protrusions are received in the openings such that the first latch member is in loose engagement with the second latch member. The first connector housing is thus held in a side-by-side relationship with the second connector housing with a slight relative movement, or float, allowed.

Other objects, advantages and novel features of the present invention will be drawn from the following detailed description of preferred embodiments of the present invention.

DETAILED DESCRIPTION OF THE INVENTION

Figure 1:
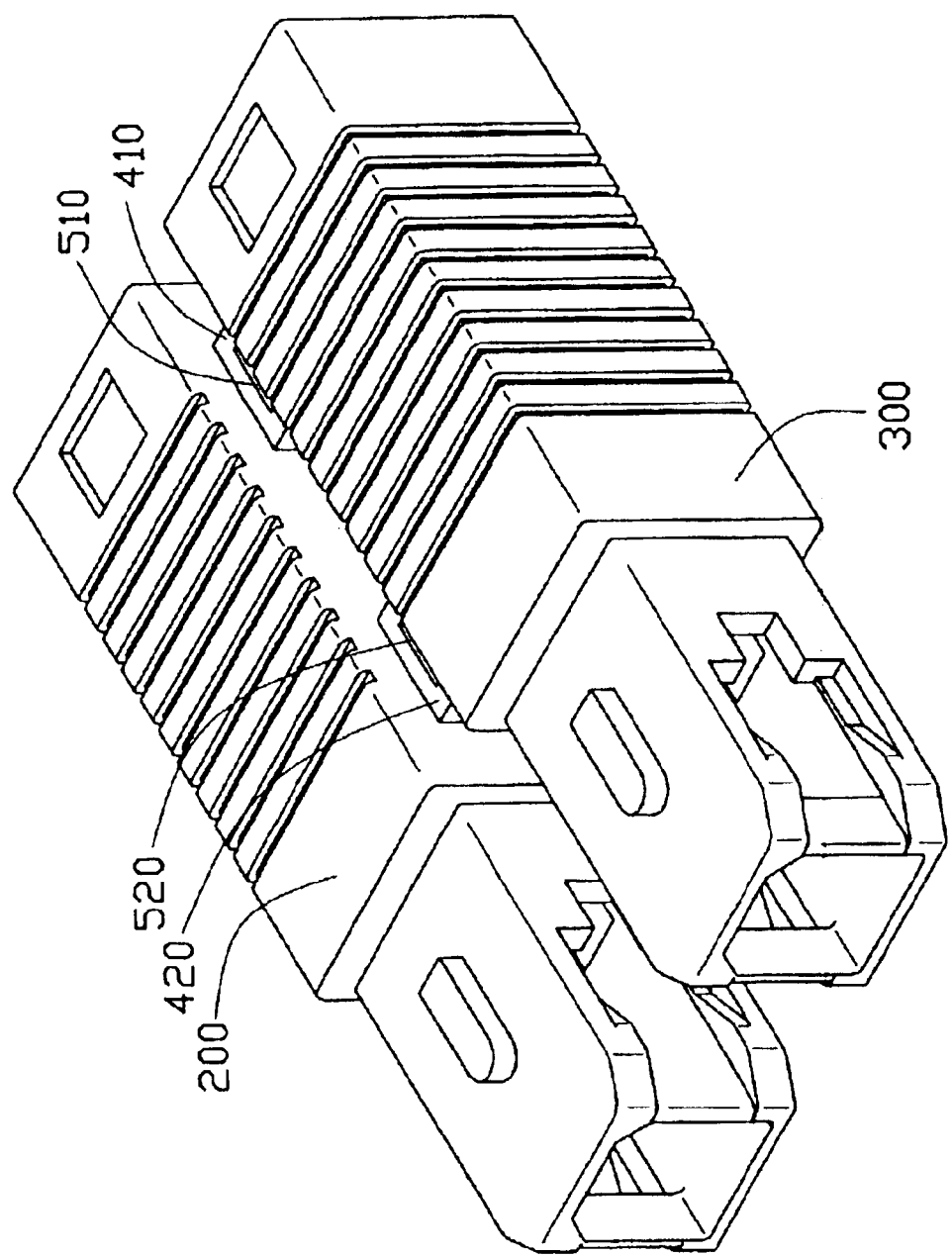
FIG. 1 is a perspective view of a duplex fiber optic connector device having a pair of connector housings maintained in a side-by-side relationship according to a preferred embodiment of the present invention.
Figure 2:
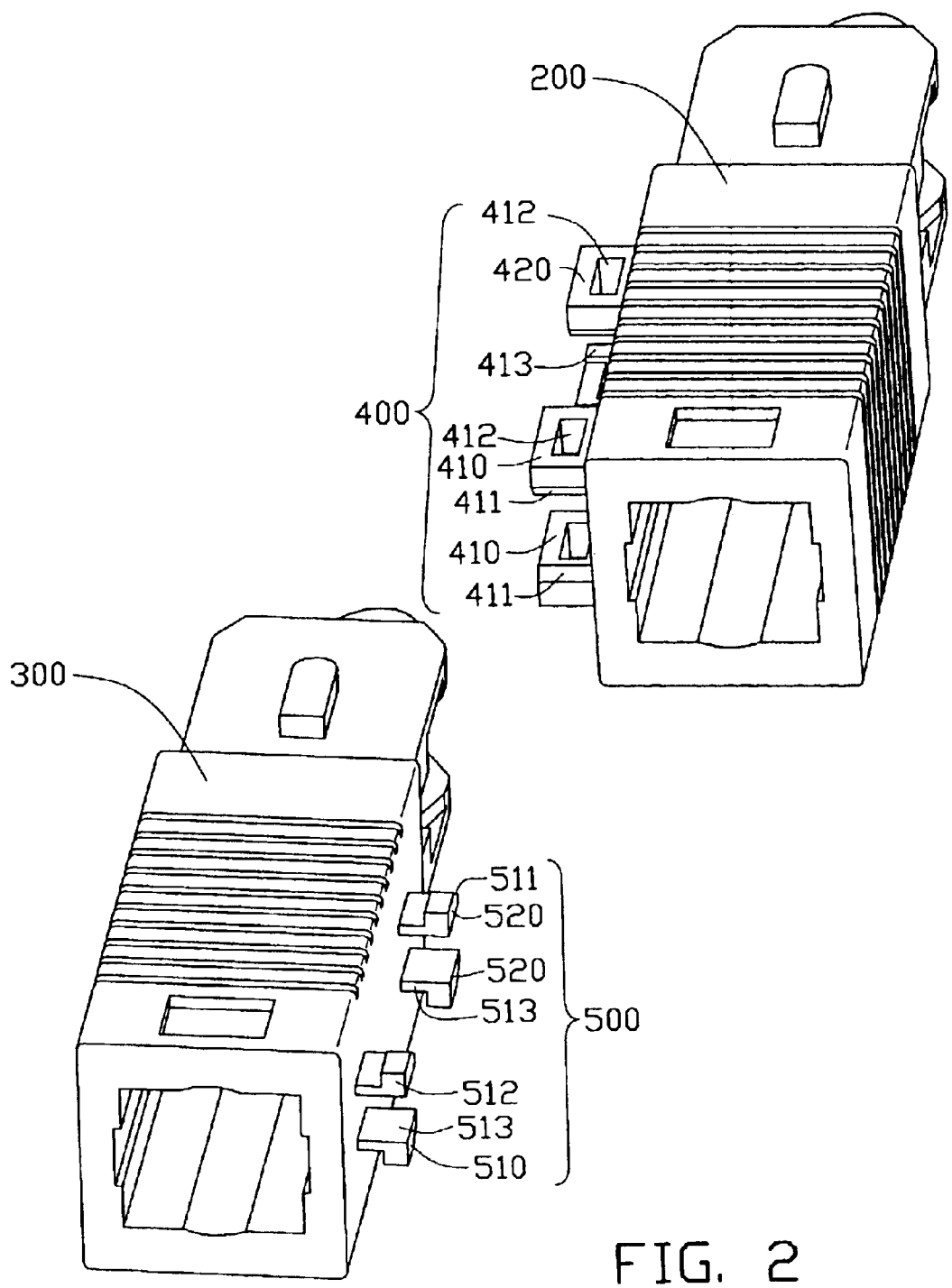
FIG. 2 is an exploded, perspective view of the duplex fiber optic connector device of FIG. 1, in which the first connector housing and the second connector housing are separated from each other.

Referring to FIG. 1 and FIG. 2, a duplex fiber optic connector device according to a preferred embodiment of the present invention comprises a first connector housing 200 for receiving a first optical fiber plug (not shown) and a second connector housing 300 for receiving a second optical fiber plug (not shown). FIG. 1 shows the engaged device from a frontal aspect; FIG. 2 shows the device separated into component housings 200, 300 from a rearward aspect.

The first connector housing 200 comprises a first latch member 400 unitarily molded therewith. The first latch member 400 comprises a pair of rear retention members 410 and a pair of front retention members 420 projecting laterally outwardly from a sidewall (not labeled) of the first connector housing 200. The pair of rear retention members 410 is positioned toward a rear of the sidewall. Each rear retention member 410 is parallel and opposed to the other, and is a mirror image of the other. Each rear retention member 410 defines a rectangular opening 412 therethrough and forms a first chamfered surface 411 at a rearward end thereof. The pair of front retention members 420 is positioned toward a front end of the sidewall and has a structure similar to that of the rear retention members 410, except that each front retention member 420 further comprises a stop member 413 at a forward end thereof. The stop members 413 of the pair of front retention members 420 face inwardly towards each other.

The second connector housing 300 comprises a second latch member 500 unitarily molded therewith. The second latch member 500 comprises a pair of first hooked members 510 and a pair of second hooked members 520 projecting laterally outwardly from a sidewall (not labeled) of the second connector housing 300. The first hooked members 510 are positioned toward a rearward end of the sidewall and the second hooked members 520 are positioned toward a front end of the sidewall. The first hooked members 510 have an identical structure with the second hooked members 520. Each hooked member 510, 520 comprises a base portion 513 protruding outwardly from the sidewall (one surface) of the second connector housing 300 and a protrusion 512 extending outwardly from a free end of the base portion 513. A second chamfered surface 511 is formed on a forward end of each protrusion 512. Each first hooked member 510 is a mirror image of the other, and each second hooked member 520 is a mirror image of the other.

Referring to FIG. 2, when the two connector housings 200, 300 are assembled together, the second chamfered surfaces 511 of the first and second hooked members 510, 520 engage with corresponding first chamfered surfaces 411 of the rear and front retention members 410, 420. The protrusions 512 then slide forward into the rectangular openings 412 of the first latch member 400. The second latch member 500 is thus securely engaged with the first latch member 400.

Figure 3:
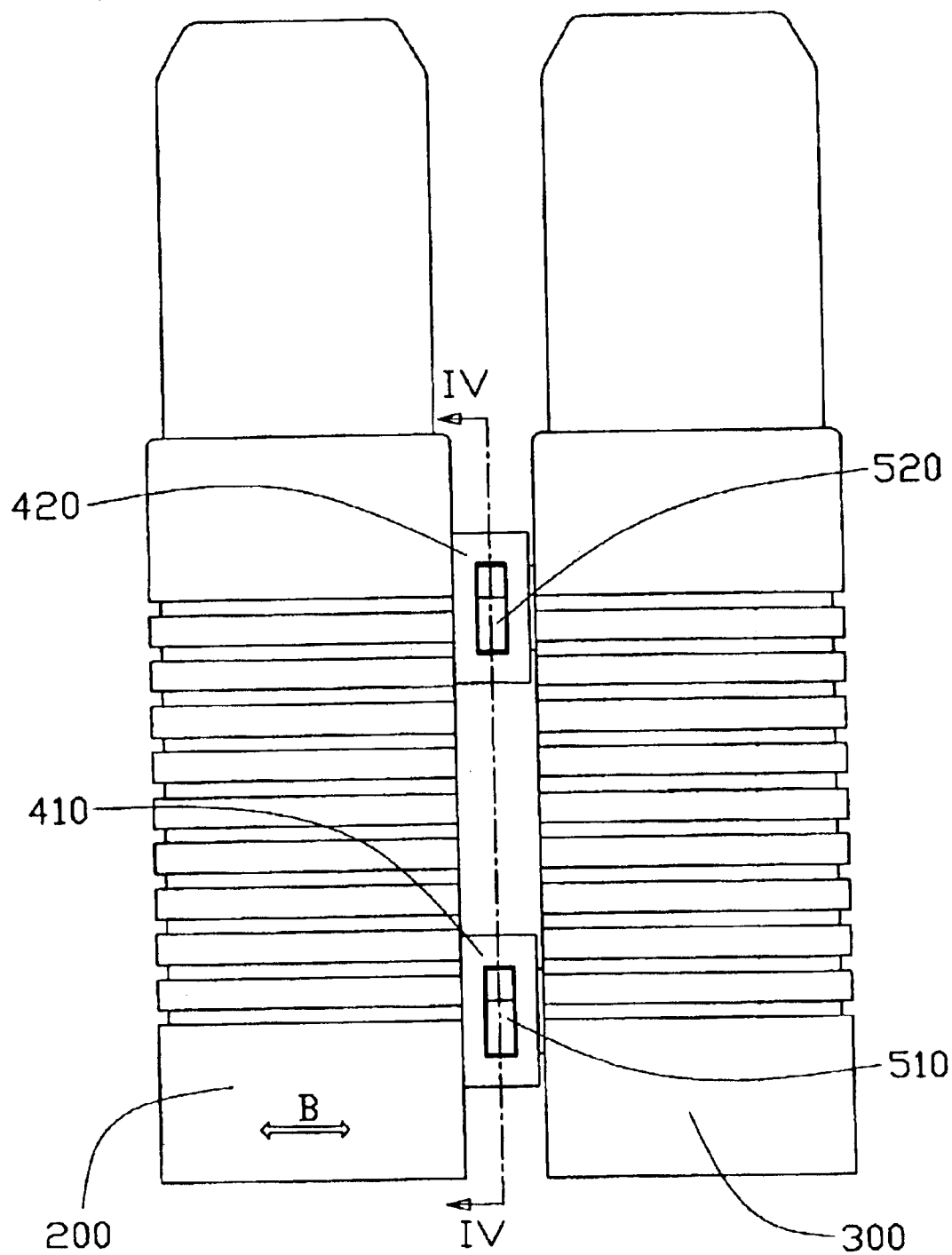
FIG. 3 is a bottom view of the duplex fiber optic connector device of FIG. 1.
Figure 4:
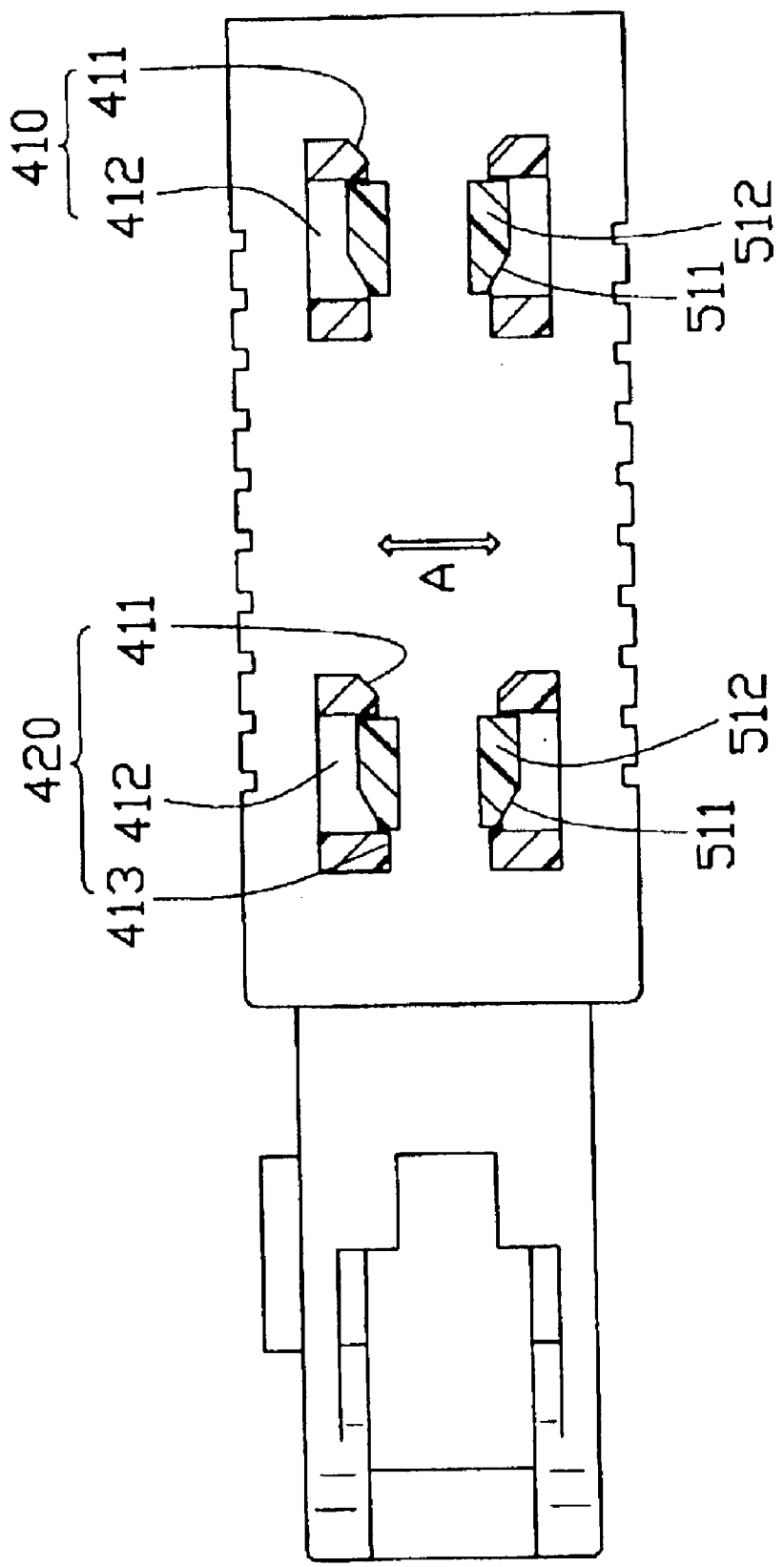
FIG. 4 is a cross sectional view of the duplex fiber optic connector device of FIG. 3 taken along line IV—IV.
Figure 5:
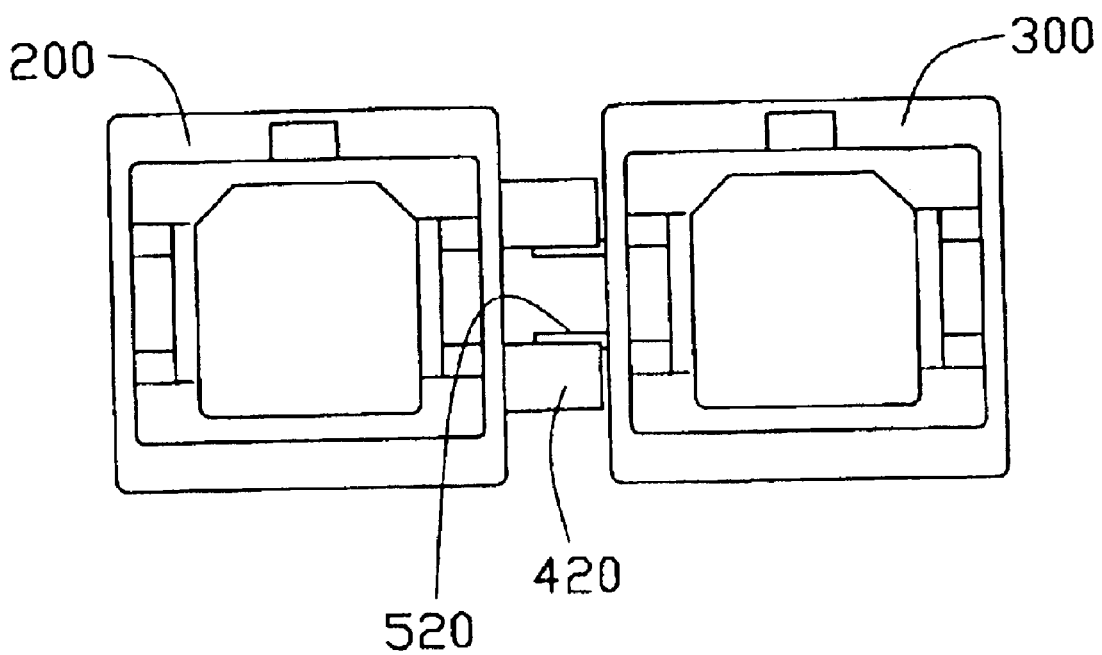
FIG. 5 is a front view of the duplex fiber optic connector device of FIG. 1.
Figure 6:
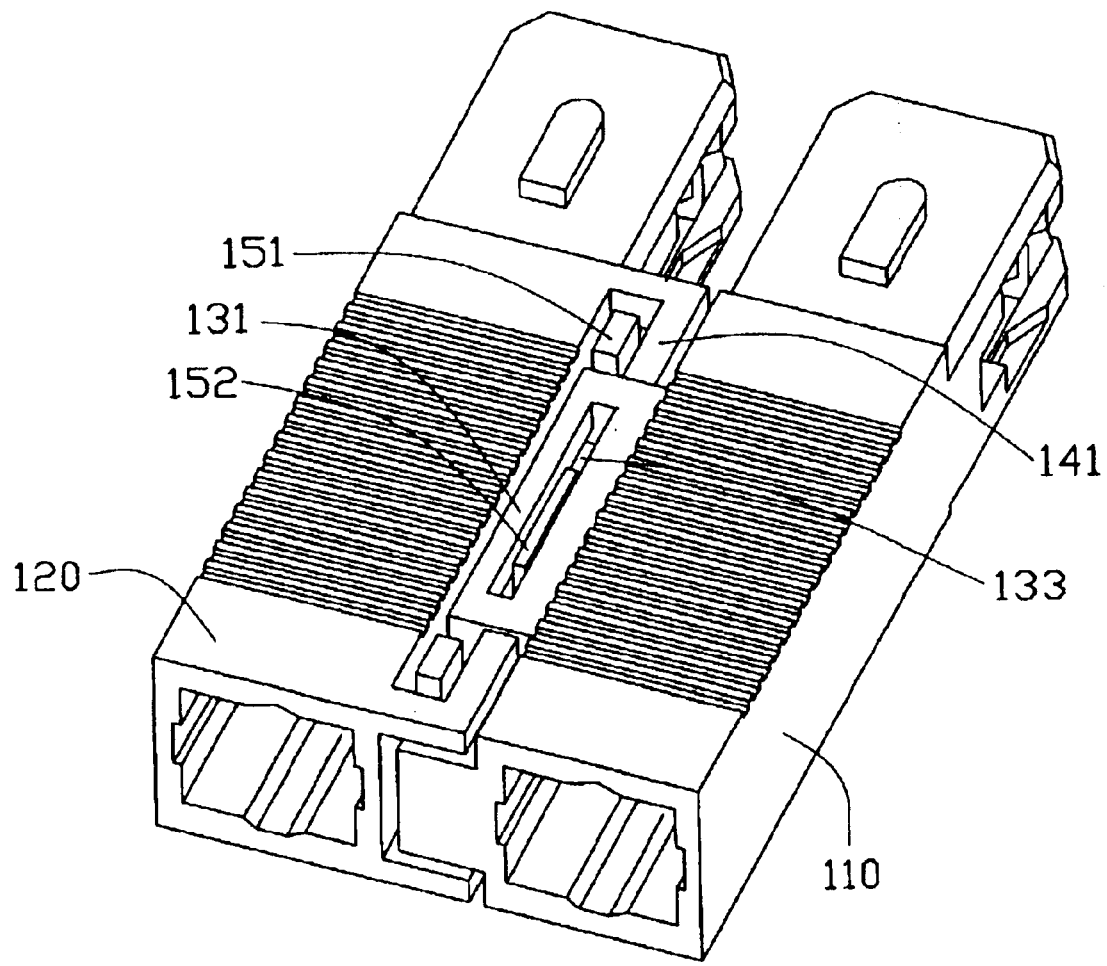
FIG. 6 is a perspective view of a prior art duplex fiber optic connector system with a first connector housing and a second connector housing maintained in a side-by-side relationship.
Figure 7:
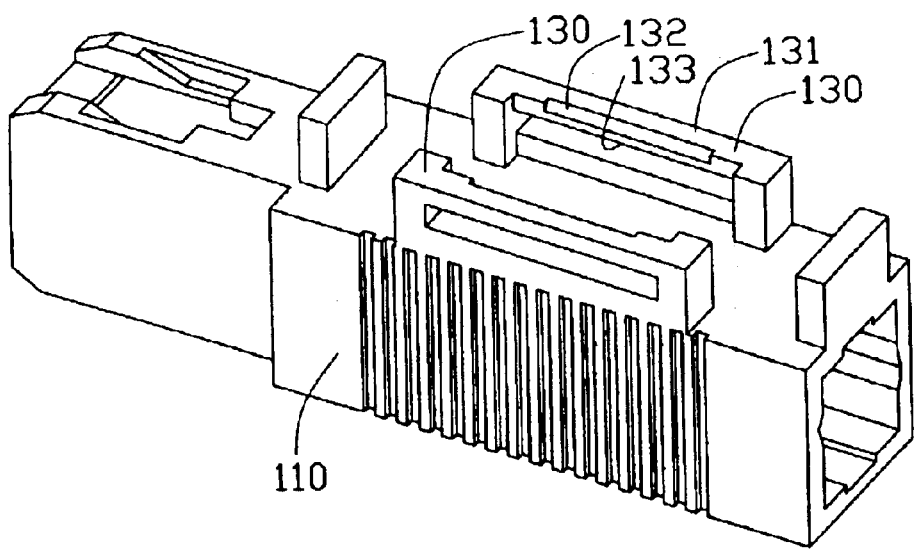
FIG. 7 is a perspective view of the first connector housing of the prior art duplex fiber optic connector system of FIG. 6.
Figure 8:
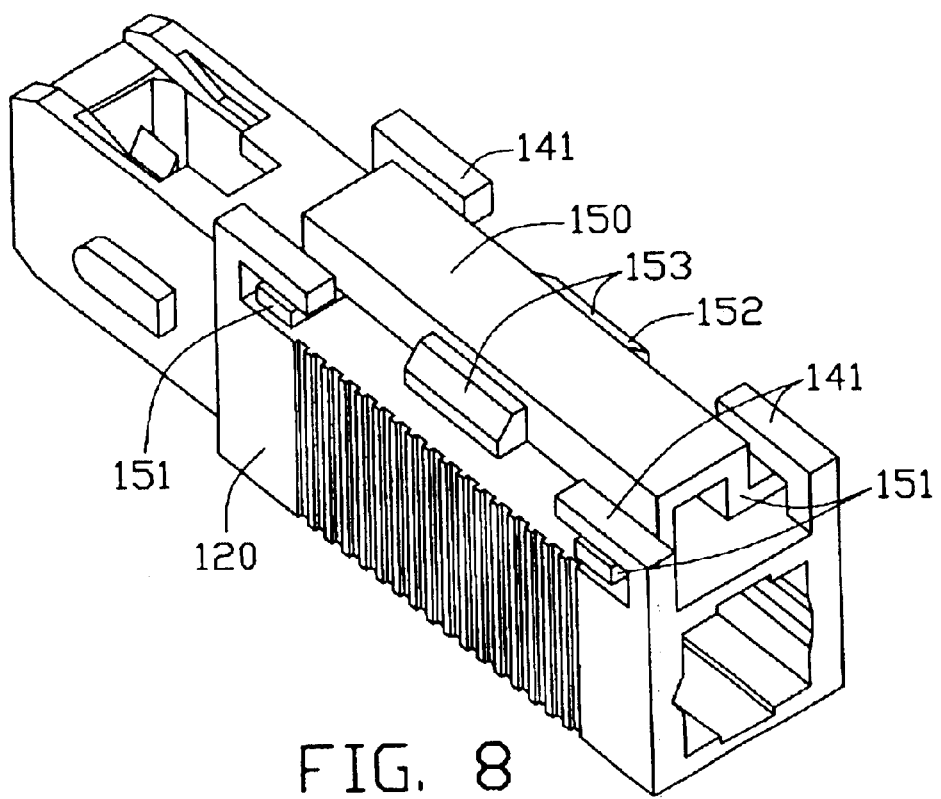
FIG. 8 is a perspective view of the second connector housing of the prior art duplex fiber optic connector system of FIG. 6.

Referring to FIG. 3 in conjunction with FIGS. 4 and 5, when the second latch member 500 engages with the first latch member 400, the protrusions 512 are engaged in the rectangular openings 412. Front and rear ends of the protrusions 512 interfere with the corresponding inside walls of the openings 412. Front ends of the second hooked members 520 press against the stop members 413 of the front retention members 420. Therefore, the second latch member 500 and the first latch member 400 cannot move back and forth relative to each other. A width of each protrusion 512 is narrower than that of the rectangular opening 412 so that there is relative movement between the second latch member 500 and the first latch member 400 in the direction of arrow "B" in FIG. 3. A vertical distance between the base portions 513 is smaller than that between the two retention members 410, 420 so that the first latch member 400 can move up and down in a small amount relative to the second latch member 500 in the direction of arrow "A" in FIG. 4. The first latch member 400 is thus loosely engaged with the second latch member 500 so that the first connector housing 200 is engaged in parallel with the second connector housing 300, but with a slight amount of relative movement or "float".

When a force is imposed inwardly on the first and second connector housings 200, 300, the protrusions 512 each move toward their complementary member, the first hooked members 510 of the second latch member 500, moving toward each other, and the second hooked members 520 moving towards each other. The chamfered surfaces 511 of the second hooked member 520 therefore disengage from the stop members 413. Force can then be applied to push the second connector housing 300 forward relative to the first connector housing 200 so that the protrusions 512 gradually disengage from the rectangular openings 412 along the direction of the chamfered surfaces 511. The first connector housing 200 is thus separated from the second connector housing 300.

Compared with conventional duplex connector devices, the connector housings 200, 300 of the present invention are held in a side-by-side relationship with a slight relative movement, or float, allowed therebetween since the protrusions 512 of the second latch member 500 are in loose engagement with the rectangular openings 412 of the first latch member 400. This structure is configured to compensate for manufacturing tolerances so that the connector housings can mate with corresponding optical fiber plugs properly. Moreover, this structure is simple and easy to manufacture. In addition, it allows easy disassembly due to the chamfered surfaces of the latch members.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

What is claimed is:

1. A duplex fiber optic connector device, comprising:
 a first connector housing for receiving a first optical fiber plug, and including a first latch member unitarily molded therewith; and
 a second connector housing for receiving a second optical fiber plug, and including a second latch member unitarily molded therewith;
 wherein the first latch member comprises at least a pair of retention members protruding from an outside wall of the first connector housing, each retention member having a rectangular opening defined therethrough, and at least one of retention members having a stop member extending from a forward end thereof, and the second latch member comprises at least a pair of hooked members, each hook member having a base portion and a protrusion which protrudes from the retention member, the protrusions being loosely received in the openings such that the first latch member is in loose engagement with the second latch member, which, in turn, provides float between the first connector housing and the second connector housing.

2. The duplex fiber optic connector device of claim 1, wherein a vertical distance between the base portions is smaller than that between the two retention members.

3. The duplex fiber optic connector device of claim 2, wherein a width of each protrusion is narrower than that of the rectangular opening.

4. The duplex fiber optic connector device of claim 3, wherein the first latch member further comprises two front connector housing and two rear retention members parallel to each other at a rear end of the first connector housing, and the second latch member comprises four hooked members and each of the four hooked members further comprises a base portion protruding outwardly from one surface of the second connector housing.

5. The duplex fiber optic connector device of claim 4, wherein each of the two front retention members and two rear retention members has a first chamfered surface thereon defined at a rearward end thereof.

6. The duplex fiber optic connector device of claim 1, wherein each of the retention members has a stop member, and the stop members face inwardly towards each other.

7. The duplex fiber optic connector device of claim 4, wherein each protrusion has a chamfered surface on a forward end thereof.

8. A duplex fiber optic connector device, comprising:

a first connector housing for receiving a first optical fiber plug, and including a first latch member unitarily molded therewith; and a second connector housing for receiving a second optical fiber plug, and including a second latch member unitarily molded therewith;

wherein the first latch member comprises a plurality of retention members protruding from an outside wall of the first connector housing, and the retention members have stop members which face inwardly towards each other and rectangular openings defined therethrough, and the second latch member comprises a plurality of hooked members protruding from an outside wall of the second connector housing, each retention member a base portion and a protrusion extending outwardly from the base portion, and the hooked members are engaged with the retention members by the protrusions being loosely received in the openings such that the first connector housing is held in a side-by-side relationship with the second connector housing with float therebetween.

9. The duplex fiber optic connector device of claim 8, wherein said at least one of the retention members has several sidewalls together with the stop member defining the rectangular opening.

10. The duplex fiber optic connector device of claim 8, wherein the plurality of retention members comprises two front retention members at a forward end of one surface thereof, and two rear retention members at a rearward end of the same surface.

11. The duplex fiber optic connector device of claim 10, wherein a chamfered surface defined at a rearward end of each of the two front retention members, and the stop member extends from a forward end of each of the two front retention members.

12. A duplex connector device comprising:

first and second connectors extending individually along a lengthwise direction while side by side combined with each other in a lateral direction;

the first connector defining a first mating port and a first latch member integrally formed therewith;

the second connector defining a second mating port and a second latch member integrally formed therewith;

the first latch member including a pair of first retention members extending in said lengthwise and lateral directions;

the second latch member including a pair of second retention members extending in said lengthwise and lateral directions;

the pair of second retention members engageably sandwiched between said pair of first retention members;

one pair of said pairs of first retenilon members and said second retention members defining opening regions, and the other pair of said pairs of first retention members and said second retention members defining protrusion regions retainably received within the corresponding opening regions; wherein a tapered section is formed on one of the opening region and the corresponding protrusion region so as to allow the first latch member and the second retention member to be assembled with each other along one of said lengthwise and lateral directions.

13. The device of claim 12, wherein said first connector and said second connector are floatable with each other in either the lateral direction or a vertical direction perpendicular to said lengthwise direction and said lateral direction, when a significant clearance is formed between the first latch member and the second latch member.

14. The device of claim 12, wherern at least one pair of said stop members extend inwardly towards each other.

* * * * *